US012048260B2

(12) United States Patent
Sakundiak et al.

(10) Patent No.: US 12,048,260 B2
(45) Date of Patent: Jul. 30, 2024

(54) AGRICULTURAL IMPLEMENT WITH END WHEEL ASSEMBLY

(71) Applicant: Degelman Industries, LP, Regina (CA)

(72) Inventors: Tyler Sakundiak, Buena Vista (CA); Lyndon Maurer, Regina (CA)

(73) Assignee: Degelman Industries LP

( * ) Notice: Subject to any disclaimer, the term of this patent is extended or adjusted under 35 U.S.C. 154(b) by 162 days.

(21) Appl. No.: 17/456,423

(22) Filed: Nov. 24, 2021

(65) Prior Publication Data
US 2023/0157196 A1 May 25, 2023

(51) Int. Cl.
A01B 63/16 (2006.01)
A01B 29/02 (2006.01)
A01B 73/00 (2006.01)
A01B 73/06 (2006.01)

(52) U.S. Cl.
CPC .............. *A01B 63/16* (2013.01); *A01B 29/02* (2013.01); *A01B 73/005* (2013.01); *A01B 73/067* (2013.01)

(58) Field of Classification Search
CPC ..... A01B 73/067; A01B 73/005; A01B 29/02; A01B 63/16; A01B 29/04; A01B 29/041; A01B 29/045; A01B 29/046; A01B 29/048; A01B 27/005; A01B 63/026; A01B 73/00; A01B 63/045
See application file for complete search history.

(56) References Cited

U.S. PATENT DOCUMENTS

| 2,353,659 | A |   | 7/1944  | Frank         |             |
|-----------|---|---|---------|---------------|-------------|
| 4,119,156 | A |   | 10/1978 | Wheeler et al.|             |
| 4,127,283 | A | * | 11/1978 | Baden         | A01B 73/005 |
|           |   |   |         |               | 172/689     |
| 4,360,215 | A | * | 11/1982 | Nohl          | A01B 73/067 |
|           |   |   |         |               | 280/43.23   |
| 4,496,004 | A | * | 1/1985  | Frase         | A01B 73/067 |
|           |   |   |         |               | 172/383     |
| 4,660,651 | A | * | 4/1987  | Pfenninger    | A01B 49/06  |
|           |   |   |         |               | 111/152     |
| 5,054,560 | A | * | 10/1991 | Foley         | A01B 63/16  |
|           |   |   |         |               | 172/313     |
| 5,261,497 | A | * | 11/1993 | Snyder        | A01B 59/04  |
|           |   |   |         |               | 172/383     |
| 5,562,167 | A | * | 10/1996 | Honey         | A01B 73/00  |
|           |   |   |         |               | 172/385     |

(Continued)

Primary Examiner — Adam J Behrens
Assistant Examiner — Blake E Scoville
(74) Attorney, Agent, or Firm — Craig J. Lervick; Larkin Hoffman Daly & Lindgren, Ltd.

(57) ABSTRACT

An end wheel assembly for transforming an implement frame from a transport position to a field position is provided. The end wheel assembly can have an end wheel, a wheel pivot rotatably connected to the end wheel, a wheel member pivotally connected to the wheel pivot, at least one attachment bracket attached to the wheel member and pivotally attachable to the implement frame, a wheel actuator to raise and lower the end wheel assembly, and a guide plate. The guide plate can have a channel, a first end connected to the wheel member, and a second end connected to the wheel pivot. The channel can be positioned to receive a positioning member when the end wheel assembly is pivoted downwards and to rotate the guide plate causing the wheel pivot and end wheel to rotate relative to the wheel member and turn the end wheel outwards.

24 Claims, 13 Drawing Sheets

(56) References Cited

U.S. PATENT DOCUMENTS

| | | | |
|---|---|---|---|
| 5,660,237 | A | 8/1997 | Boyko et al. |
| 6,076,613 | A | 6/2000 | Frasier |
| 6,179,092 | B1 * | 1/2001 | Naaktgeboren ........ A01B 73/00 188/69 |
| 8,235,133 | B2 * | 8/2012 | Friggstad ............ B60B 33/0002 16/35 R |
| 8,291,994 | B2 * | 10/2012 | Hulicsko ................ A01B 29/02 172/311 |
| 9,220,188 | B2 | 12/2015 | Graham et al. |
| 9,839,171 | B2 * | 12/2017 | Redekop .............. A01B 73/067 |
| 10,638,653 | B2 | 5/2020 | Anderson et al. |
| 10,729,054 | B2 | 8/2020 | Dekam |
| 2015/0129260 | A1 * | 5/2015 | Blunier .................. F16C 23/08 172/552 |
| 2015/0156947 | A1 | 6/2015 | Sudbrink et al. |
| 2018/0092286 | A1 * | 4/2018 | Anderson ............. A01B 63/16 |

\* cited by examiner

AGRICULTURAL IMPLEMENT WITH END WHEEL ASSEMBLY

The present invention relates to agricultural implement and more particularly an end wheel assembly for an agricultural implement to transform the agricultural implement between a transport position and an operating position.

BACKGROUND

Agricultural implements, such as land rollers, are pulled behind a tractor or other tow vehicle to perform an agricultural function in a field. In the case of a land roller, the land roller is used to compact the soil and press stones into the field to create a flat field surface and to increase the soil density in the field before or after a crop is planted in the field.

These agricultural implements are typically of a substantial size because the wider the working path of the implement as it is pulled through a field, the more surface area of the field that can be covered with each pass of the tow vehicle and implement. However, when the implement is to be transported to another field, often down a roadway, this width of the implement is a problem because a wide implement is harder to transport and the implement has to be narrow enough to fit on the roadway. These implements often have a first wing section and a second wing section containing the soil tools, such as rollers for a land roller. These wing sections can be pivoted into a field position, with the wing sections positioned perpendicular to a travel direction of the agricultural implement when the agricultural implement is to be pulled through a field in order to increase the width of the implement. The wing sections can also be pivoted into a transport position, with the wing sections pivoted parallel to the travel direction of the agricultural implement so that the width of the agricultural implement is reduced when the agricultural implement is to be transported to another field.

To convert the implement from a transport position to a field position, and vice versa, can be difficult and require a number of components.

SUMMARY OF THE INVENTION

In an aspect, an implement is provided. The implement can have a center section, a first wing section having a first end and a second end, the first end of the first wing section pivotally connected to the center section, a first positioning member connected to the second end of the first wing section, a second wing section having a first end and a second end, the first end of the second wing section pivotally connected to the center section, a second positioning member connected to the second end of the second wing section, a hitch assembly attached to the center section so the implement can be towed in a travel direction, a first and second end wheel assembly. The first end wheel assembly can be attached to the second end of the first wing section and have an end wheel, a wheel pivot rotatably connected to the end wheel, a wheel member pivotally connected to the wheel pivot, at least one attachment bracket attached to the wheel member and pivotally attached to second end of the first wing section, and a guide plate. The guide plate having a channel, a first end connected to the wheel member, and a second end connected to the wheel pivot, the channel positioned to receive the first positioning member when the first wheel assembly is pivoted downwards and to rotate the guide plate causing the wheel pivot and end wheel to rotate relative to the wheel member and turn the end wheel outwards. The second end wheel assembly can be attached to the second end of the second wing section and have an end wheel, a wheel pivot rotatably connected to the end wheel, a wheel member pivotally connected to the wheel pivot, at least one attachment bracket attached to the wheel member and pivotally attached to second end of the second wing section, and a guide plate. The guide plate having a channel, a first end connected to the wheel member, and a second end connected to the wheel pivot, the channel positioned to receive the second positioning member when the first wheel assembly is pivoted downwards and to rotate the guide plate causing the wheel pivot and end wheel to rotate relative to the wheel member and turn the end wheel outwards.

In another aspect, an end wheel assembly for transforming an implement frame from a transport position to a field position is provided. The end wheel assembly can have an end wheel, a wheel pivot rotatably connected to the end wheel, a wheel member pivotally connected to the wheel pivot, at least one attachment bracket attached to the wheel member and pivotally attachable to the implement frame, a wheel actuator to raise and lower the end wheel assembly, and a guide plate. The guide plate can have a channel, a first end connected to the wheel member, and a second end connected to the wheel pivot. The channel can be positioned to receive a positioning member attached to the implement frame when the end wheel assembly is pivoted downwards and to rotate the guide plate causing the wheel pivot and end wheel to rotate relative to the wheel member and turn the end wheel outwards.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
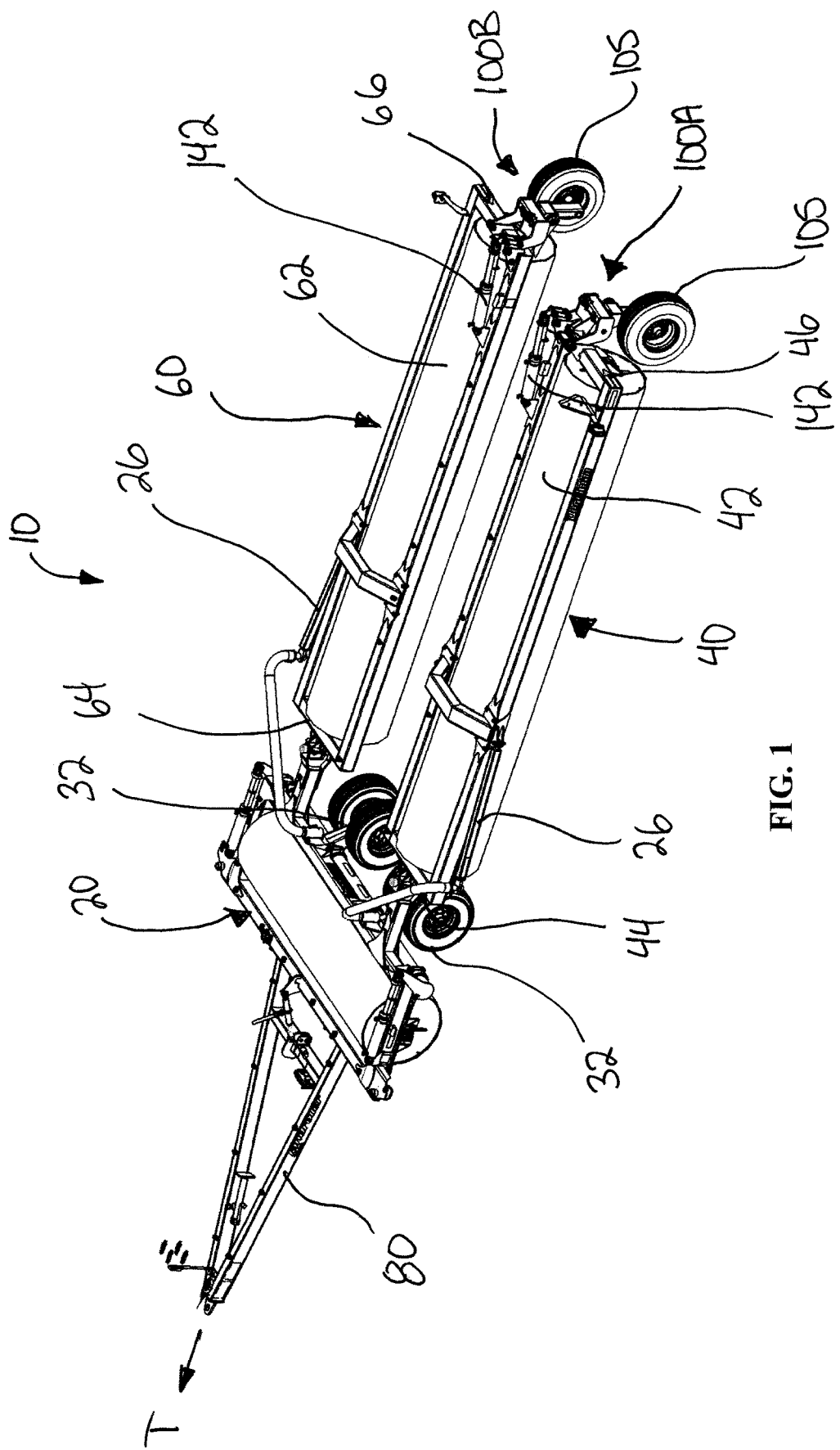
FIG. 1 is a perspective view of an agricultural implement having end wheel assemblies.

FIG. 1 illustrates an agricultural implement 10 that is typically towed behind a tractor or other tow vehicle in an agricultural field. Implement 10 is shown as a land roller with rollers 22, 42, and 62 for flattening a field to create a smoother surface for spraying, harvesting, etc. and to increase the soil density of the field before or after planting a crop. The implement 10 can have a center section 20, a first wing section 40, and a second wing section 60. The first wing section 40 can be pivotally connected at a first end 44 to the center section 20 and the second wing section 60 can be pivotally connected at a first 64 to the center section 20. Although FIG. 1 illustrates the implement 10 as a land roller, the implement could be any agricultural implement with a pair of wing sections where soil tools are provided on the wing sections. If the implement 10 is a land roller, the center section 20 can be provided with a center roller 22, the first wing section 40 can be provided with a first wing roller 42, and the second wing section 60 can be provided with a second wing roller 62.

Ground wheels 32 can be provided attached to the center section 20 and vertically moveable, with an actuator, such as a hydraulic cylinder, so that the ground wheels 32 can be moved downwards to lift the center section 20, and the center roller 22, if the implement is a land roller, off of the ground surface for transport of the implement 10 and the ground wheels 32 can be moved upwards to lower the center section 20 relative to the ground surface.

A first end wheel assembly 100A can be provided at a second end 46 of the first wing section 40 and a second end wheel assembly 100B can be provided at a second end 66 of the second wing section 60. The first end wheel assembly 100A and the second end wheel assembly 100B can have end wheels 105

A hitch assembly 80 can be provided attached to the center section 20 to hitch the implement 10 to a tow vehicle (not shown).

Figure 2:
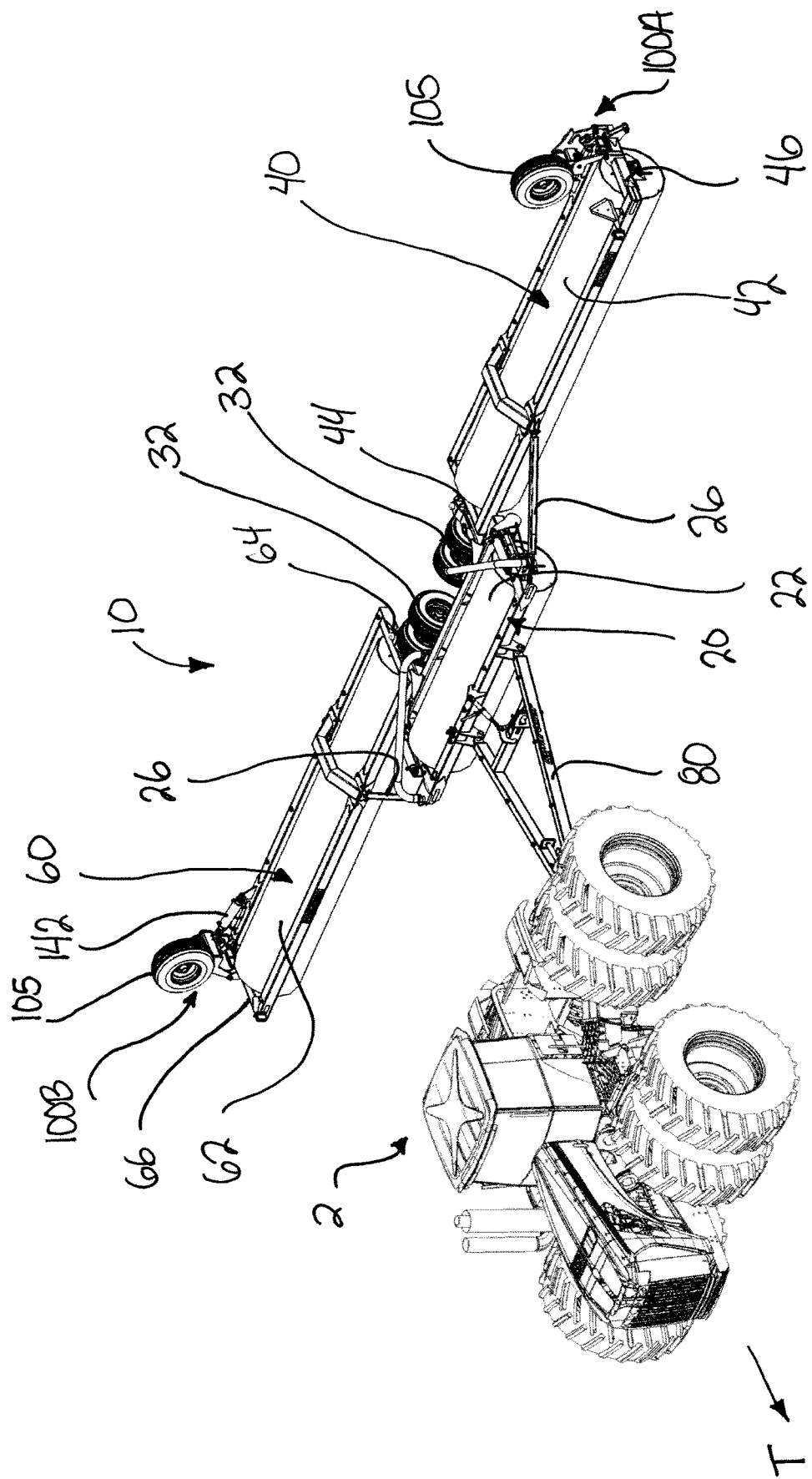
FIG. 2 is a perspective view of the implement of FIG. 1 in a field position and being towed by a tow vehicle.
Figure 3:
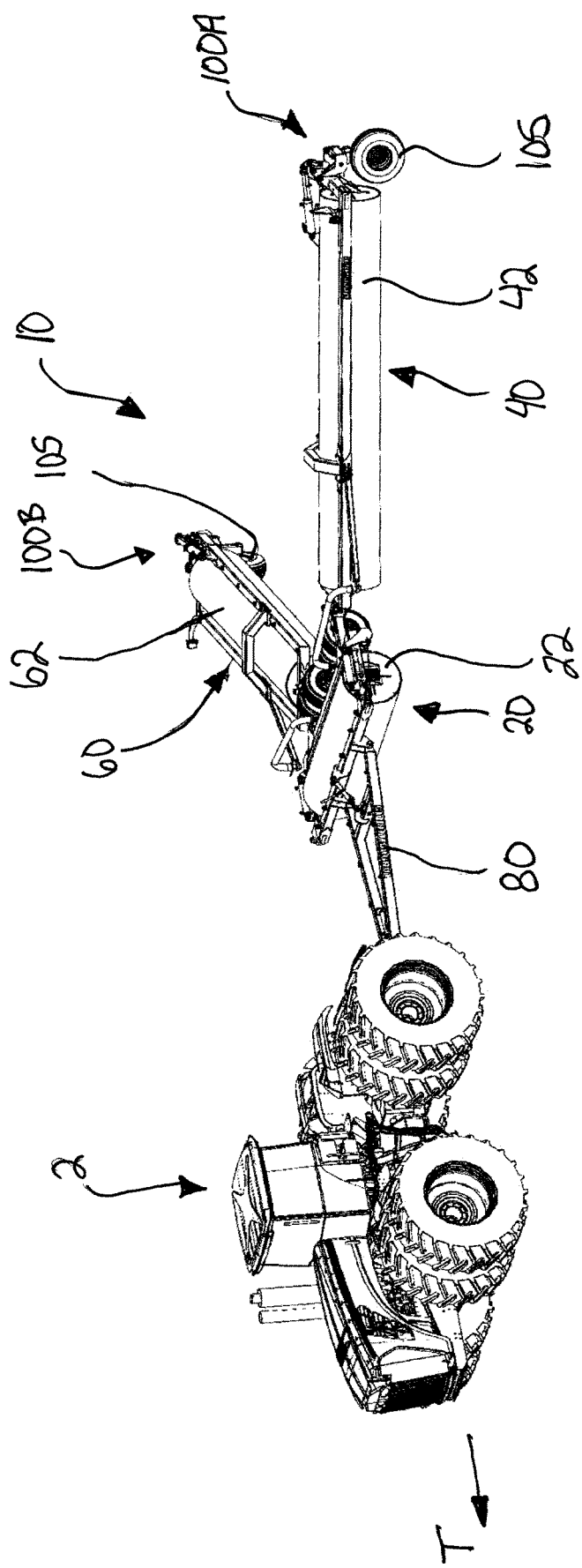
FIG. 3 is a perspective view of the implement of FIG. 1 being transformed from the transport position into the field position.
Figure 4:
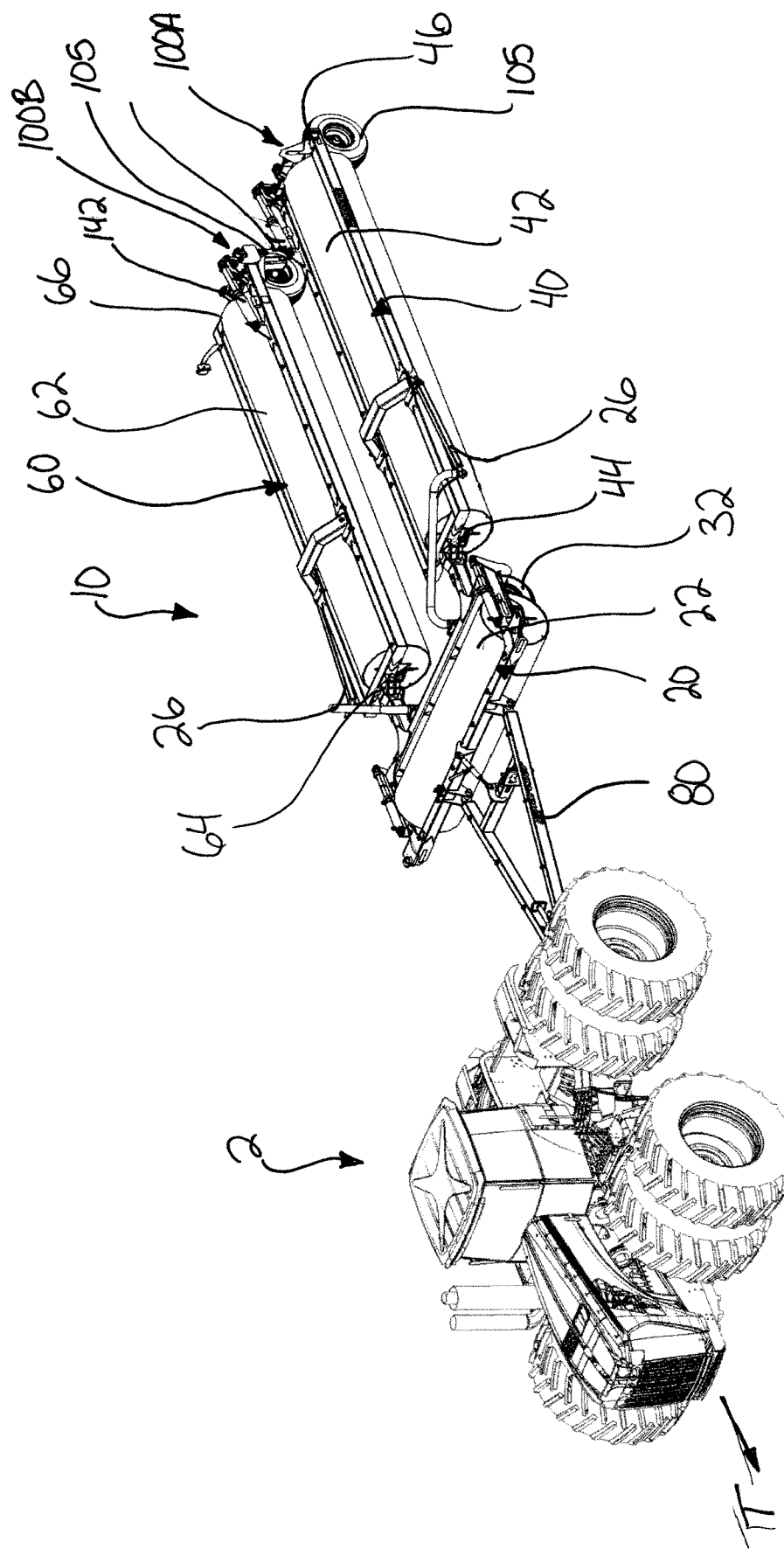
FIG. 4 is a perspective view of the implement of FIG. 1 in the transport position.

Referring to FIGS. 2-4, the implement 10 can be hitched to a tow vehicle 2, such as a tractor, and towed in a travel direction T of the implement 10. The implement 10 can be converted between a field position, as shown in FIG. 2, and a transport position, as shown in FIG. 4. FIG. 3 shows the implement 10 in the midst of being transformed from the transport position into the field position. Referring to FIG. 2, in the field position the first wing section 40 and the second wing section 60 are pivoted forward to be positioned substantially perpendicular to the travel direction T of the implement 10. This allows the center section 20, the first wing section 40 and the second wing section 60 to cover a wide swath of field as the implement 10 is pulled through the field by a tow vehicle 2. When the implement 10 is in the field position, the end wheels 105 in the end wheel assemblies 100A, 100B can be in their up position so they are not supporting the first wing section 40 and the second wing section 60 and the first wing roller 42 and the second wing roller 62 are resting on the ground surface. The ground wheels 32 can also be moved vertically upwards so the ground wheels 32 are not supporting the center section 20 off the ground surface and center roller 22 is resting on the ground surface.

When the implement 10 is to be pulled to another location or field, such as when the implement 10 is to be transported down a roadway, the implement 10 can be put in the transport position. Referring to FIG. 4, in the transport position the first wing section 40 and the second wing section 60 can be pivoted backwards behind the center section 20 with the first wing section 40 and the second wing section 60 positioned substantially parallel to the travel direction T of the implement 10. The end wheel assemblies 100A, 100B can be positioned with their end wheels 105 in their down position so that the end wheel assembly 100A is supporting the first wing section 40 above the ground surface and the end wheel assembly 100B is supporting the second wing section 60 above the ground surface. The grounds wheels 32 can also be place in their down positions so that the center section 20, the first wing section 40 and the second wing section 60 are all positioned above the ground surface.

To transform the implement 10 from the field position, shown in FIG. 2, to the transport position, shown in FIG. 4, positioning members 26 connected between the center section 20 and the first wing section 40 and the second wing section 60, respectively, can be disconnected. These positioning members 26 are used when the implement 10 is in the field position to prevent the first wing section 40 and the second wing section 60 from pivoting around their first ends 44, 46 and keeping the first wing section 40 and the second wing section 60 positioned substantially perpendicular to the travel direction T of the implement 10. When the positioning members 26 are disconnected, the first wing section 40 and the second wing section 60 are free to pivot around their first ends 44, 64, so that the tow vehicle 2 simply has to drive forwards in the travel direction T for the wing sections 40, 60 to pivot from their field position shown in FIG. 2, to the transport position shown in FIG. 4, with the wing section 40, 60 substantially parallel to the travel direction T of the implement 10. The end wheels 32 and the end wheels assemblies 100A, 100B can all be lowered so that the center section 20, the first wing section 40 and the second wing section 60 are all supported above the ground surface and the implement 10 can be easily towed.

While the implement 10 can be transformed from the field position to the transport position by simply disconnecting the positioning members 26 and pulling the implement 10 forwards in the travel direction T, it is not so straightforward to transform the implement 10 from the transport position to the field position. When the implement 10 is in the transport position, the end wheels 105 on the end wheel assemblies 100A, 100B must be positioned so that the end wheels 105 are pointed in the travel direction T of the implement 10 so that the implement 10 can be towed in the travel direction T and the first wing section 40 and the second wing section 60 will remain substantially parallel to one another. However, to transform the implement 10 from the transport position to the field position, the end wheels 105 of the end wheels assemblies 100A, 100B have to be angled so that the end wheels 105 are toed out when the implement 10 is being reversed in a direction opposite to the travel direction T. In this manner, with the toed out end wheels 105 on the end wheel assemblies 100A, 100B, the reversing of the implement 10 in a direction opposite the travel direction T will cause the second end 46 of the first wing section 40 and the second end 66 of the second wing section 60 to move outwards from the travel direction T as the implement 10 is reversed because the second ends 46, 66 will be following the direction the end wheels 105 of the end wheels assemblies 100A, 100B are pointed. This will cause the second end 46 of the first wing section 40 and the second end 66 of the second wing section 60 to move apart from one another, as shown in FIG. 3. The implement 10 can continued to be backed up in a direction opposite the travel direction T until the first wing section 40 and the second wing section 60 are substantially perpendicular to the travel direction T and the implement 10 is in the field position.

When first wing section 40 and the second wing section 60 are substantially perpendicular to the travel direction T, the end wheels 105 on the end wheel assemblies 100A, 100B can be raised and the positioning members 26 used to connect the center section 20 to the first wing section 40 and the second wing section 60.

Figure 5:
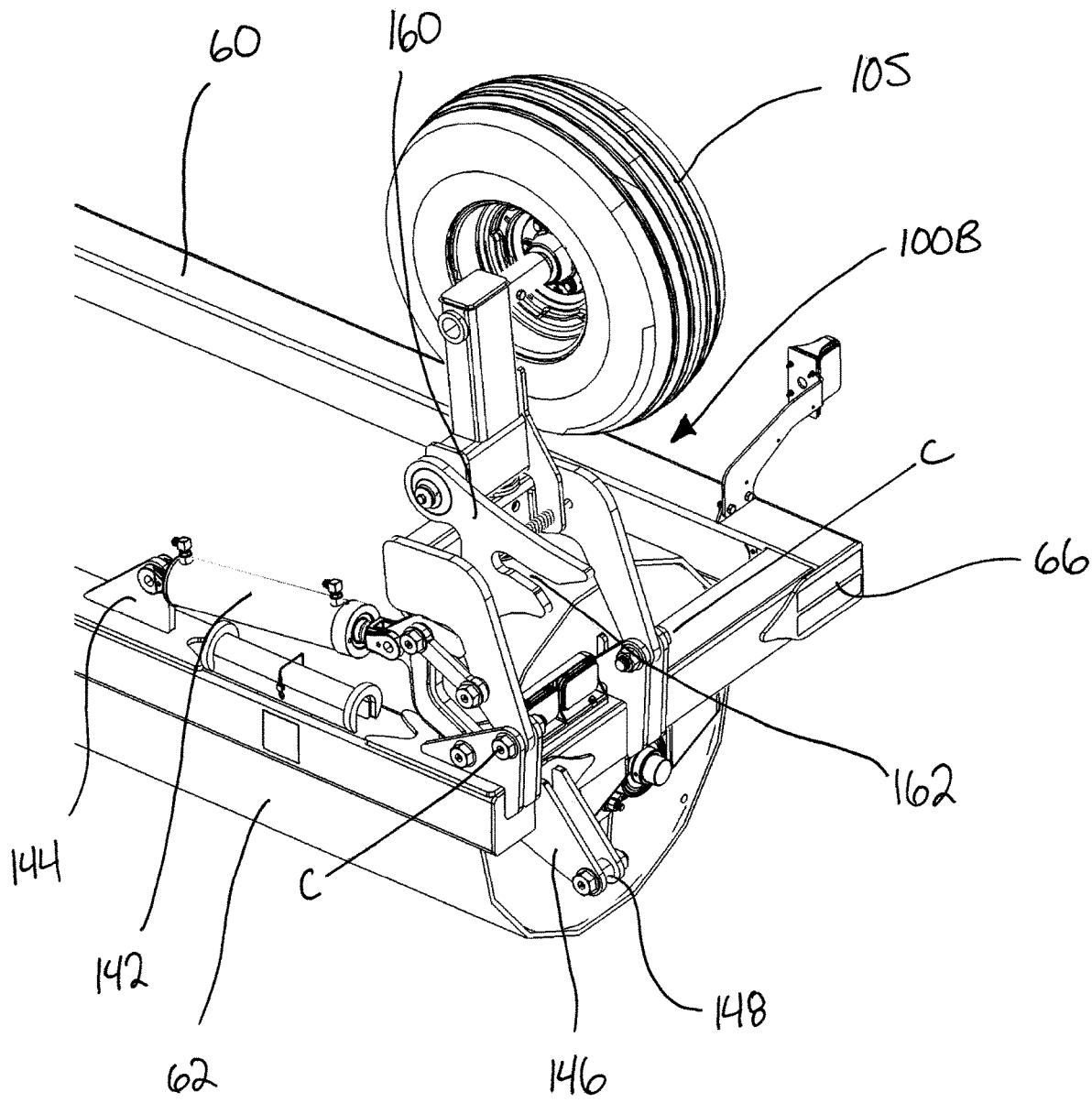
FIG. 5 is a close up view of an end wheel assembly on an end of a wing section of an implement with the end wheel assembly in a field position.
Figure 6:
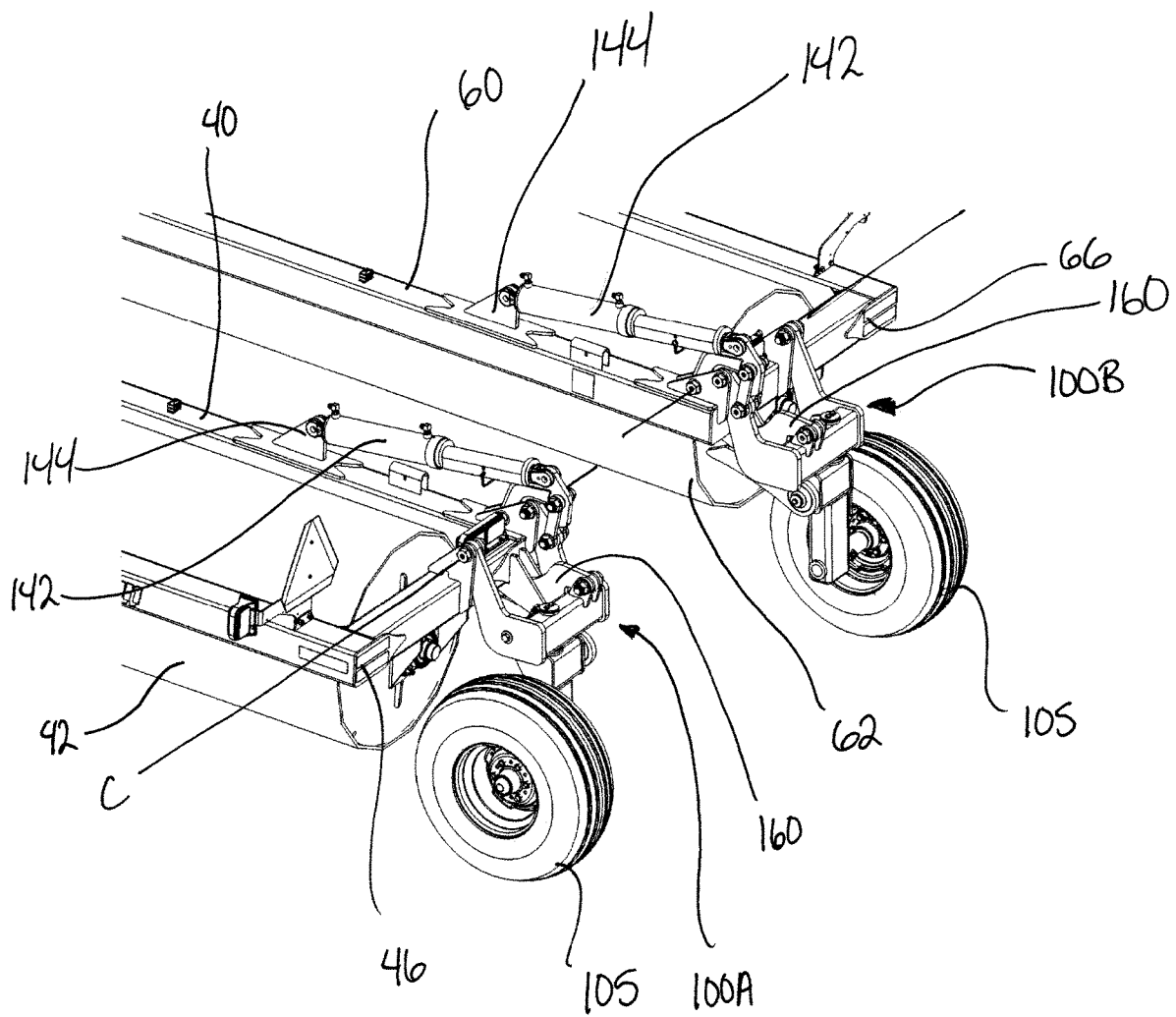
FIG. 6 is a close up view of end wheel assemblies on ends of wing sections of an implement with the end wheel assemblies in a transport position.
Figure 7:
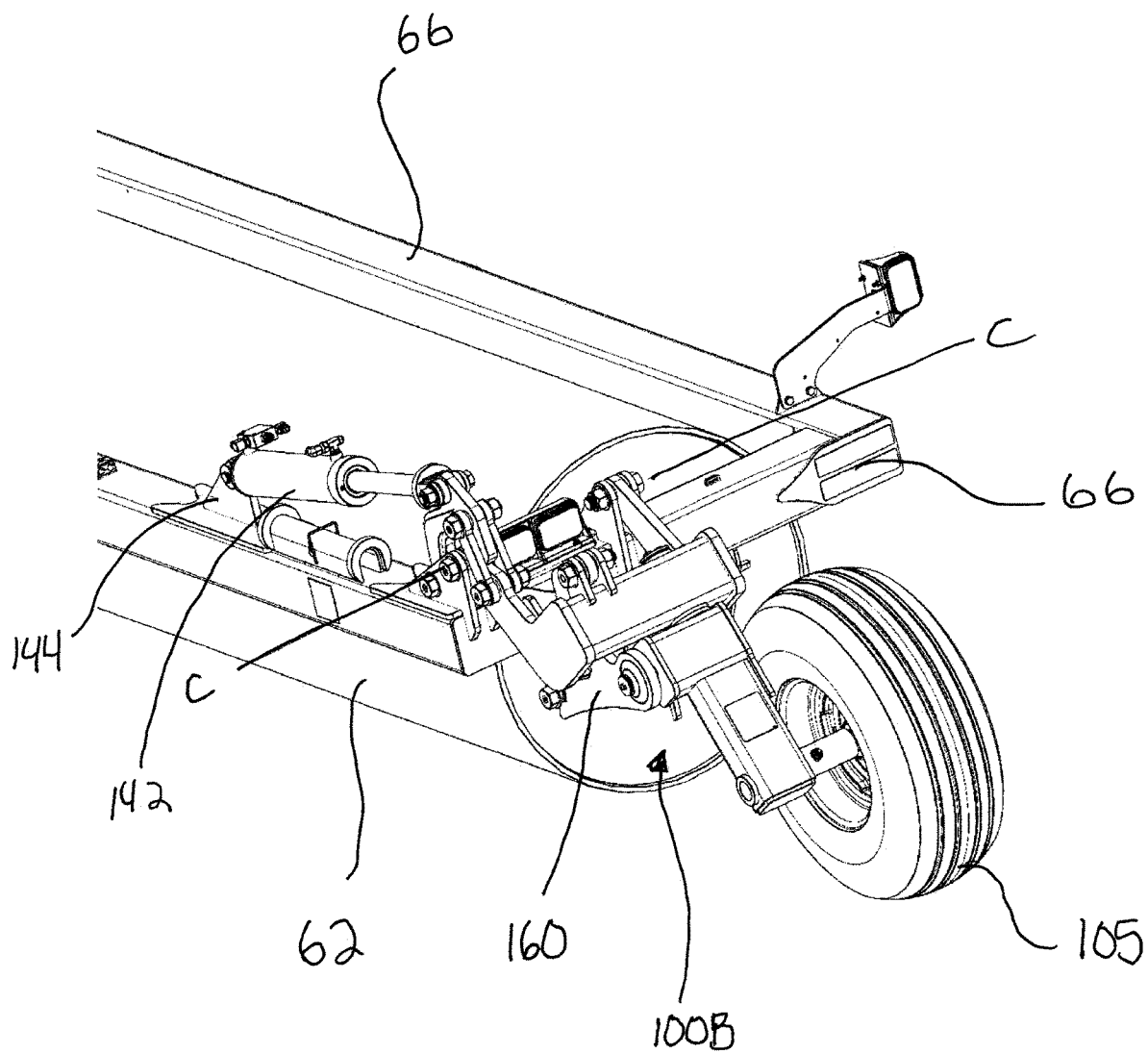
FIG. 7 is a close up view of an end wheel assembly on an end of a wing section of an implement with the end wheel assembly in an unfolding position.

The end wheel assemblies 100A, 100B are attached at second end 46 of the first wing section 40 and the second end 66 of the second wing section 60, respectively, and can be transformed between the field position (FIG. 5 shows end wheel assembly 100B in the field position), a transport position shown in FIG. 6, and an unfolding position shown in FIG. 7. Referring to FIG. 5, in the field position, end wheel assembly 100B is pivoted upwards so that the end wheel 105 is lifted up and off the ground surface and the second wing roller 62 is resting on the ground surface. Referring to FIG. 6, in the transport position, the end wheel assemblies 100A, 100B are pivoted downwards so that the ends wheels 105 are positioned down and in contact with the ground surface and the first wing roller 42 and the second wing roller 62 is lifted off of the ground surface.

The end wheel assemblies 100A, 100B can also be placed in an unfolding position where the end wheels 105 of the end wheel assemblies 100A, 100B where the end wheels 105 are raised slightly causing the end wheel assemblies 100A, 100B to angle the end wheels 105 outwards. Referring to FIG. 7, the end wheel assembly 100B is in an unfolding position where the end wheel 105 of the end wheel assembly 100B is in contact with the ground surface, but the end wheel 105 is raised slightly causing the end wheel assembly 100B to angle the end wheel 105 outwards so that when the implement 10 is backed up the outward-pointing end wheel 105 causes the second end 66 of the second wing section 60 to move outwards from one another.

Figure 8:
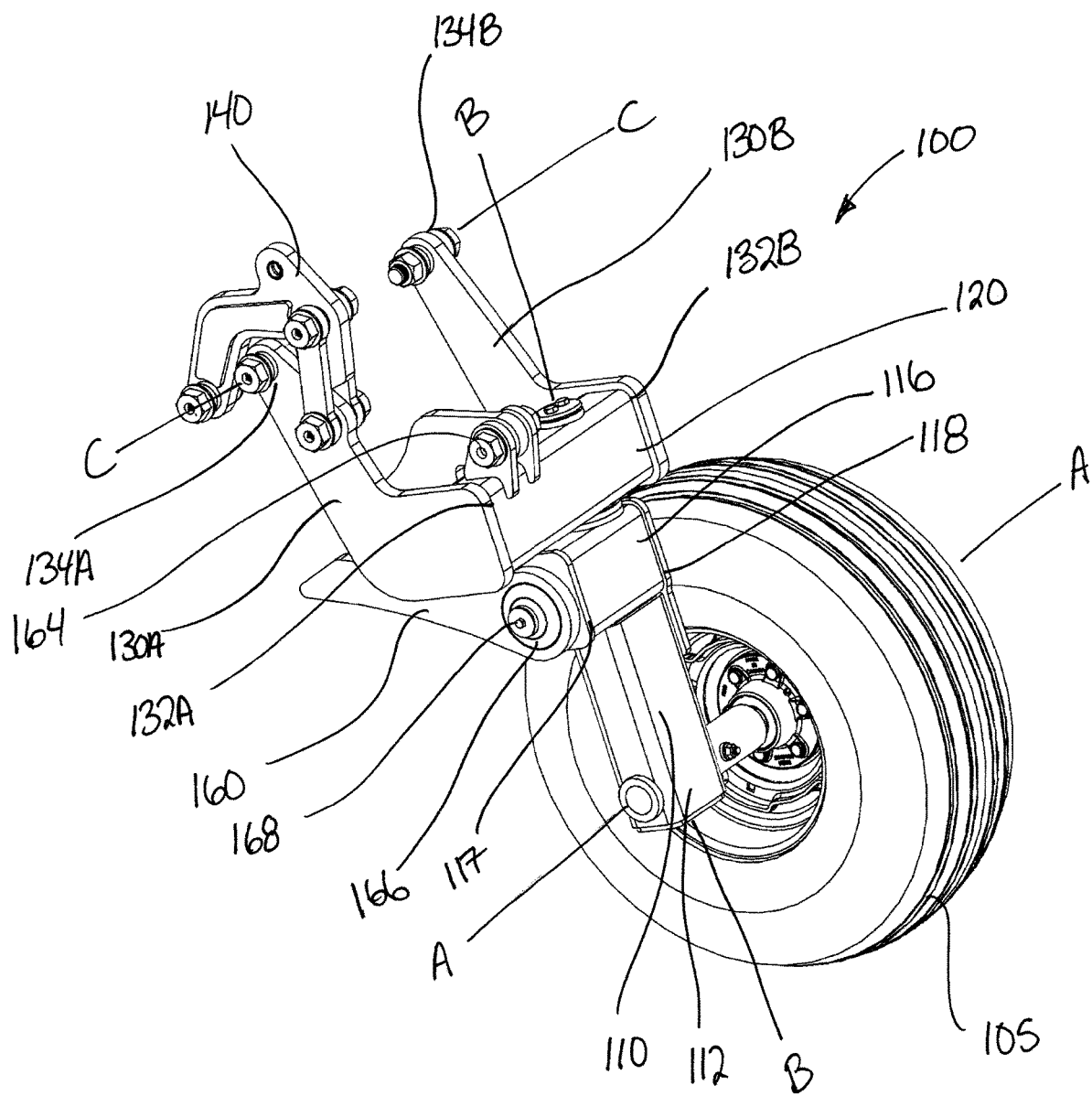
FIG. 8 is a rear perspective view of an end wheel assembly.
Figure 9:
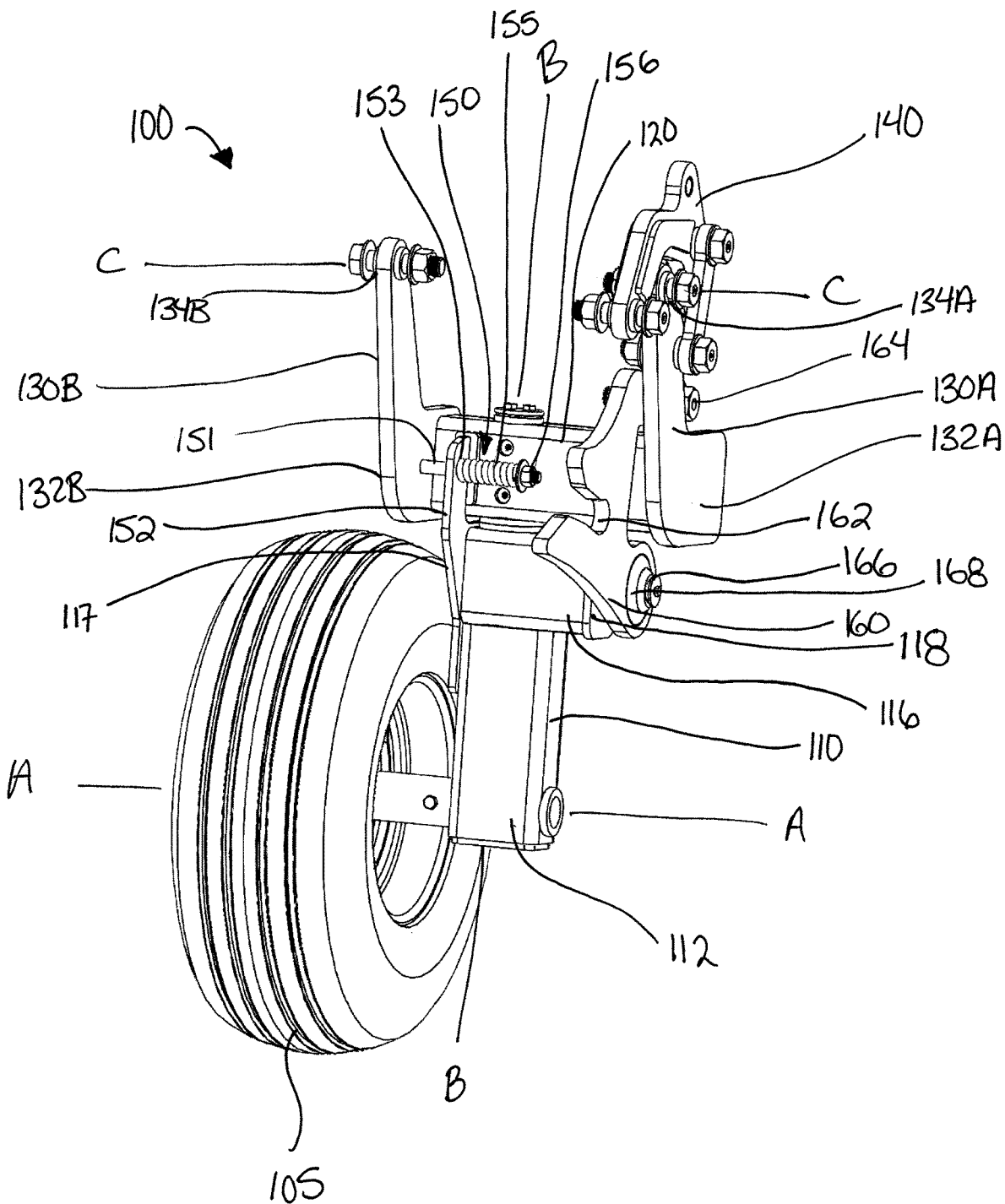
FIG. 9 is a front perspective view of the end wheel assembly of FIG. 8.
Figure 10:
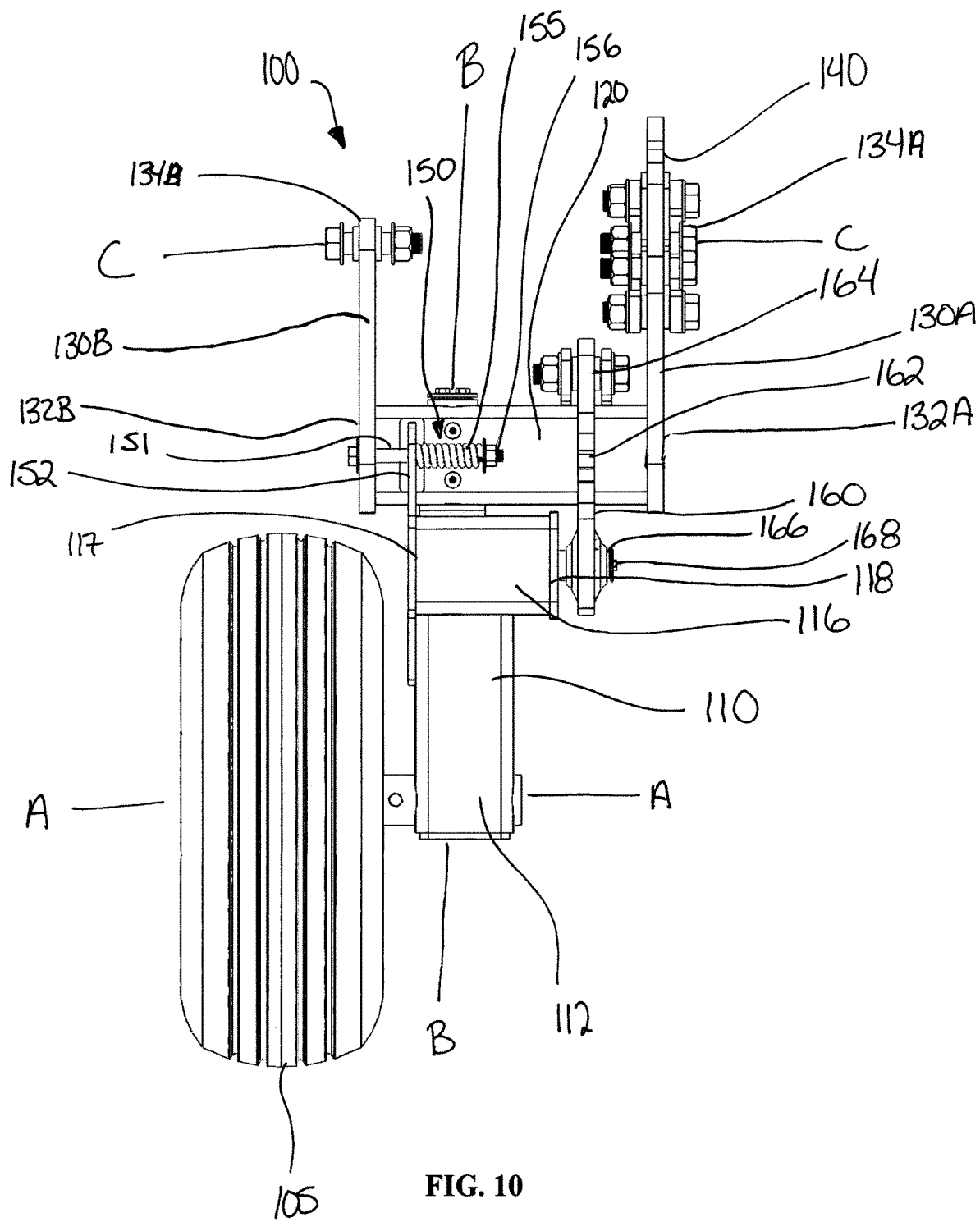
FIG. 10 is a rear view of the end wheel assembly of FIG. 8.

FIGS. 8-10 illustrates an end wheel assembly 100 for use in transforming the implement 10 between the transport position and the field position. End wheel assembly 100 has the same orientation as end wheel assembly 100A shown in FIGS. 1-7. End wheel assembly 100B can be a mirror image of end wheel assembly 100. The end wheel assembly 100 can include an end wheel 105; a wheel pivot 110; a wheel member 120; a pair of attachment brackets 130A, 130B; a wheel actuator bracket 140; a biasing device 150; and a guide plate 160 having a channel 162.

The end wheel 105 can be rotatably connected to the wheel pivot 110 so that the end wheel 105 can rotate around an axis A when the end wheel 105 is positioned against a ground surface and the implement 10 is towed by a tow vehicle.

The wheel pivot 110 can have a vertical member 112 and a horizontal member 116 attached to the top of the vertical member 112. The wheel pivot 110 can be rotatably connected to the wheel member 120 so that the wheel pivot 110 and the end wheel 105 can pivot around axis B relative to the wheel member 120. In one aspect, the horizontal member 116 can have a first end 117 and a second end 118 and be pivotally connected to the wheel member 120. The vertical member 112 can be rotatably connected to the end wheel 105.

The wheel member 120, and therefore the wheel pivot 110 and the end wheel 105, can be attached to the implement frame by a pair of attachment brackets 130A, 130B. First ends 132A, 132B of the attachment brackets 130A, 130B can be connected to the wheel member 120 and second ends 134A, 134B of the attachment brackets 130A, 130B can be pivotally connected to the implement frame so that the entire end wheel assembly 100 can pivot relative to the implement frame around axis C. Referring to FIGS. 5-7, end wheel assemblies 100A, 100B are rotatable around axis C to move them between the field position shown in FIG. 5, the transport position shown in FIG. 6, and the folding position shown in FIG. 7.

Referring again to FIGS. 8-10, the wheel actuator bracket 140 can be connected to one of the attachment brackets 130A, 130B to allow an actuator to be attached to the wheel actuator bracket 140 and pivot the end wheel assembly 100 around axis C. Referring to FIGS. 5-7, wheel actuators 142 can be actuators, such as double acting hydraulic cylinders, positioned between the wheel actuator brackets 140 on the end wheel assemblies 100A, 100B connected to brackets 144 on the first wing frame 40 and the second wing frame 60 so that the wheel actuators 142 can pivot the end wheel assemblies 100A, 100B around axis C thereby raising and lowering the end wheels 105.

Referring again to FIGS. 9 and 10, the biasing device 150 can be operatively connected between the wheel bracket 110 and one of the brackets 130B (or the wheel member 120) to create a rotational biasing force on the wheel bracket 110 (and therefore the ground wheel 105) to pivot the wheel bracket 110 around the axis B and prevent the ground wheel 105 and the wheel bracket 110 from rotating freely. This biasing device 150 can pretension the end wheel 105 to prevent movement of the end wheel 105 when the wheel assembly 100A, 100B is in the field position and the end wheel 105 is pivoted upwards off of the ground surface.

In one aspect, the biasing device 150 can have a shaft 151 connected to the attachment brackets 130B, a biasing bracket 152 with an aperture 153 through which the shaft passes through; a spring 155 such as a compression spring; and a stopping element 156. The spring 155 can be positioned around the shaft 151 with one end of the spring 155 seated against the biasing bracket 152 and another end of the spring 155 seated against the stopping element 156 on an end of the shaft 151. When end wheel 105 and the wheel bracket 110 rotate around the axis B outwards, the spring 155 will be compressed between the biasing bracket 151 and the stopping element 156 on the shaft 151 and create a biasing force of rotational force on the wheel bracket 110 and end wheel 105 around axis B back in the direction of turning the end wheel 105 in a direction parallel to a centerline CL of an implement frame 200 shown in FIG. 12. The implement frame 200 could be the frame of the first wing section 20 or the frame of the second wing section 40 depending on which wing section the end wheel assembly is attached to.

The guide plate 160 can be connected between the wheel member 120 and the wheel pivot 110 with the channel 162 in the guide plate 160 opening towards the implement frame. A first end 164 of the guide plate 160 can be connected to the wheel member 120 and a second end 166 of the guide plate 160 can be connected to the wheel pivot 110 by a spherical bearing 168 so that the guide plate 160 can remain straight while the wheel pivot 110 may be angled relative to the guide plate 160.

Figure 11:
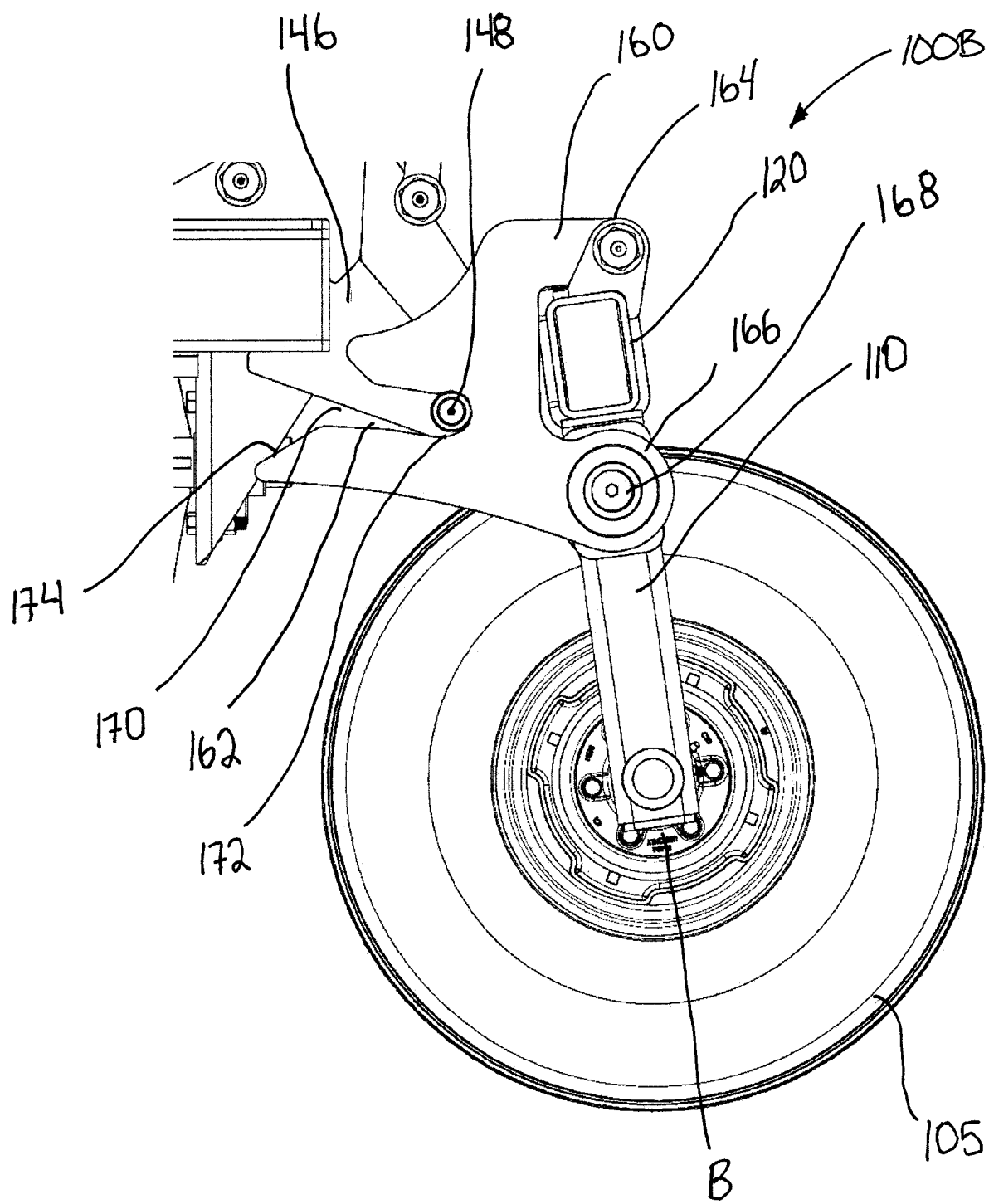
FIG. 11 is a side closeup view of the end wheel assembly of FIG. 8 showing the guide plate.

Referring to FIG. 11, the channel 162 can have an open end 170 and a terminating end 172 with the channel 162 being directed generally upwards as the channel 162 extends from the terminating end 172 to the open end 170. An angled entry 174 can be provided at the open end 160.

Referring again to FIG. 5 a positioning bracket 146 holding a rounded positioning member 148 can be provided extending from the second end 66 of the second wing section 60. Referring to FIGS. 5 and 11, the positioning bracket 146 positions the positioning member 148 relative to the guide plate 160 so that when the end wheel assembly 100B is pivoted downwards, the positioning member 148 comes into contact with the angle entry 174 on the guide plate 160. Further pivoting downwards of the end wheel assembly 100A forces the angled entry 174 against the positioning member 148, causing the guide plate 160 to rotate so the positioning member 148 can enter the channel 162 in the guide plate 160. The positioning member 148, secured to the second end 66 of the second wing frame 60 by the positioning bracket 146, can travel through the channel 162 in the guide plate 160 from the open end 170 of the channel 162 to the terminating end 172 of the channel 162 as the end wheel assembly 100B continues to be pivoted downwards around axis C.

A similar positioning bracket and member can be provided on the second end 46 of the first wing section 40 to receive the channel 170 on the guide plate 160 of the end wheel assembly 100A is pivoted downwards.

Referring to FIG. 11, when the end wheel assembly 100B is pivoted downwards so that the positioning member 148 comes into contact with the angled entry 174, the positioning member 148, securely fixed in place by the positioning bracket 146, will force the guide plate 160 to rotate in order to accommodate the unmoving positioning member 148. The first end 164 of the guide plate 160 is connected to the wheel member 120 which remains fixed in place on the end wheel assembly 100B so the guide plate 160 will be rotated downwards by the positioning member 148 being forced against the angled entry 174 around its first end 165. This rotation of the guide plate 160 around the first end 164 of the guide plate 160 will cause the second end 166 of the guide plate 160 to rotate the wheel pivot 110, the second end 166 is attached to, around the axis B and relative to the wheel member 120. The rotation of the wheel pivot 110 will, in turn, rotate the end wheel 105 around the axis B. The use of the spherical bearing 166 allows the second end 166 of the guide plate 160 to have motion (or play) relative to the wheel pivot 110.

Figure 13:
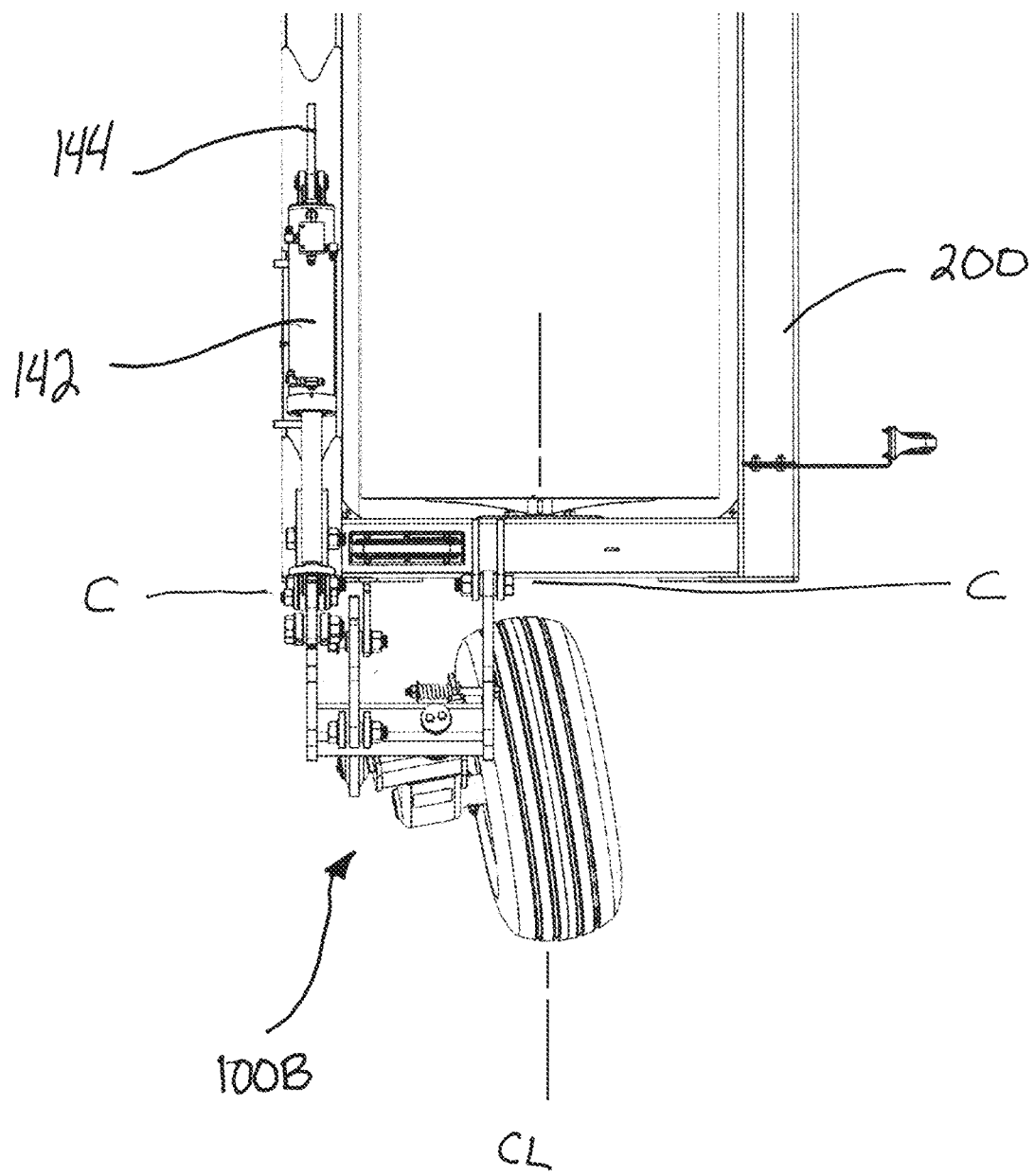
FIG. 13 is a top view of an end wheel assembly in an unfolding position.

As the downward rotation of the guide plate 160 forces the wheel pivot 110 and the end wheel 105 to rotate around axis B, the end wheel 105 will turn outwards from a centerline CL of the implement frame 200, as shown in FIG. 13. Referring to FIG. 13, this rotation or turning out of the wheel pivot 110 and the end wheel 105 will cause the direction of the end wheel 105 to be angled relative to the centerline CL of the implement frame 200 so that the end wheel is turned outwards from the center CL of the implement frame 200.

Referring to FIG. 11, the downward direction of the channel 162 from the open end 170 to the terminating end 172 causes the positioning member 148 to rotate the guide plate 160 back upwards, in a direction opposite to the direction that the angled entry 174 caused the guide plate 160 to rotate in. This rotating of the guide plate 16 in the opposite direction will cause the wheel pivot 110 and the end wheel 105 to rotate in the opposite direction around axis B so that the ground wheel 105 is turned back towards a direction parallel the centerline CL of the implement frame 200. When the end wheel assembly 100 is in the fully down position, the positioning member 148 will have reached the terminating end 172 of the channel 162 in the guide plate 160 and the end wheel 105 will again be pointing in direction parallel to the centerline CL of the implement frame 200 as shown in FIG. 12.

In operation, with the implement 10 in the transport position shown in FIG. 4, the implement 10 can be transformed into the field position by using the wheel actuators 142 to partially raise the end wheel assemblies 100A, 100B which will rotate the end wheels 105 outwards so that the end wheels 105 are angled outwards from the travel direction T of the implement 10.

Figure 12:
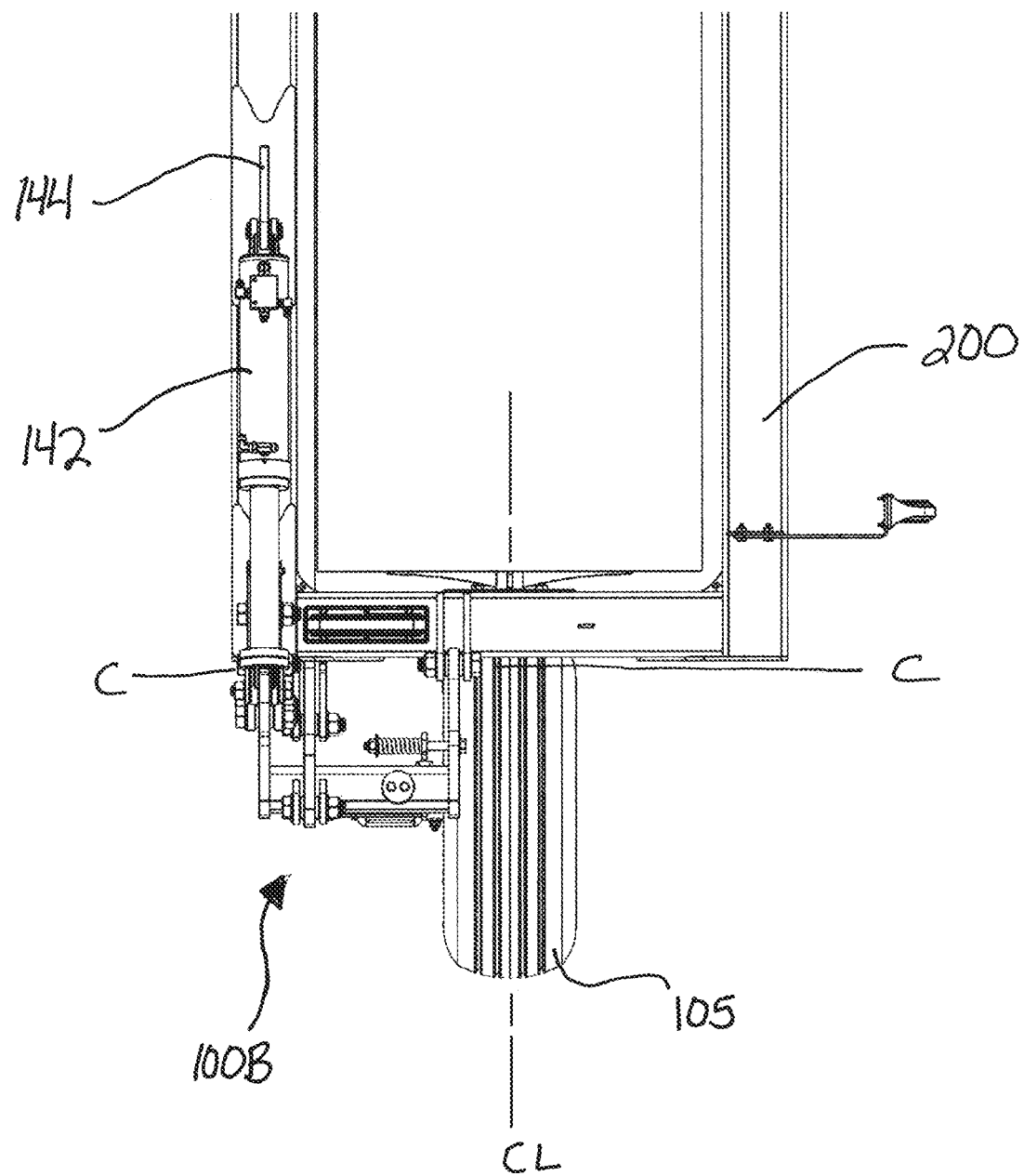
FIG. 12 is a top view of an end wheel assembly in a transport position.

When the end wheel assembly 100 is in the transport position, as shown in FIG. 12, the end wheel 105 will be pointing in a direction parallel to the centerline CL and the positioning member 148 will be positioned against the terminating end 172 of the channel 162 in the guide plate 160. Referring to FIGS. 8-10, when the end wheel assembly 100 is pivoted around axis C, the positioning member 148 will travel along the channel 162 in the guide plate 160 from the terminating end 172 to the open end 170. Because of the upward direction of the channel 162 as it runs from its terminating end 172 to its open end 170, as the positioning member 148 travels along this channel 162 the guide plate 160 will rotate downwards because of the force of the positioning member 148 against the bottom of the channel 162 since the positioning member 148 is fixed in place by the positioning bracket 146. The rotation downwards of the guide plate 160 will cause the guide plate 160 to rotate around the first end 164 of the guide plate 160 which is attached to the wheel member 120, while the second end 166 of the guide plate 160, which is attached to the wheel pivot 110 by the spherical bearing 168, will rotate the wheel pivot 110 and therefore the end wheel 105 around axis B. Referring to FIG. 13, this will cause the ground wheel 105 to be angled outwards from the centerline CL of the implement frame 200.

Referring again to FIGS. 2 and 4, with the end wheels 105 angled outwards, the tow vehicle 2 can be used to back up the implement 10 in a direction opposite to the travel direction T. The outward angling of the end wheels 105 at the ends 46, 66 of the wing sections 40, 60 will cause the ends 46, 66 of the wing sections 40, 60 to follow the direction of the end wheels 105 causing the ends 46, 66 to move outwards and apart from one another as the wing sections 40, 60 rotate around their first ends 44, 64, respectively.

The implement 10 can continue to be backed up by the tow vehicle 2 until the first wing section 40 and the second wing section 60 are position substantially perpendicular to the travel direction T of the implement 10. When the wing sections 40, 60 reach this point, the tow vehicle 2 can stop backing up the implement 10 and the positioning members 26 can be used to secure the wing sections 40, 60 in this position. The wheel actuators 142 can then be used to fully raise the end wheel assemblies 100A, 100B so the end wheels 105 are raised above the ground surface as shown in FIG. 5. At this point, the implement 10 should be in the field position shown in FIG. 2 and can be used in a field.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. An implement comprising:
   a center section;

a first wing section having a first end and a second end, the first end of the first wing section pivotally connected to the center section;
a first positioning member connected to the second end of the first wing section;
a second wing section having a first end and a second end, the first end of the second wing section pivotally connected to the center section;
a second positioning member connected to the second end of the second wing section;
a hitch assembly attached to the center section so the implement can be towed in a travel direction;
a first end wheel assembly attached to the second end of the first wing section, the first end wheel assembly comprising:
an end wheel;
a wheel pivot rotatably connected to the end wheel so that the end wheel rotates around a first axis running through a center of the end wheel;
a wheel member pivotally connected to the wheel pivot so that the wheel pivot and the end wheel pivot, relative to the wheel member, around a second axis;
at least one attachment bracket attached to the wheel member and pivotally attached to the second end of the first wing section so that the wheel member pivots around a third axis; and
a guide plate having a channel, a first end connected to the wheel member, and a second end connected to the wheel pivot, the channel positioned to receive the first positioning member when the first wheel assembly is pivoted downwards around the third axis and, as the first wheel assembly is pivoted further downwards around the third axis, the first positioning member travels through the channel, rotating the guide plate and causing the wheel pivot and the end wheel to pivot relative to the wheel member around the second axis, turning the end wheel outwards;
a second end wheel assembly attached to the second end of the second wing section, the second end wheel assembly comprising:
an end wheel;
a wheel pivot rotatably connected to the end wheel so that the end wheel rotates around a first axis running through a center of the end wheel;
a wheel member pivotally connected to the wheel pivot so that the wheel pivot and the end wheel pivot, relative to the wheel member, around a second axis;
at least one attachment bracket attached to the wheel member and pivotally attached to the second end of the second wing section so that the wheel member pivots around a third axis; and
a guide plate having a channel, a first end connected to the wheel member, and a second end connected to the wheel pivot, the channel positioned to receive the second positioning member when the first wheel assembly is pivoted downwards around the third axis, and as the first wheel assembly is pivoted further downwards around the third axis, the first positioning member travels through the channel, rotating the guide plate and causing the wheel pivot and the end wheel to pivot relative to the wheel member around the second axis, turning the end wheel outwards.

2. The implement of claim 1 further comprising: a center roller; a first wing roller; and, a second wing roller.

3. The implement of claim 1 transformable between a field position, with the first wing section and the second wing section pivoted forwards and positioned substantially perpendicular to the travel direction of the implement, and a transport position, with the first wing section and the second wing section pivoted backwards and positioned substantially perpendicular to the travel direction.

4. The implement of claim 3 wherein the first end wheel assembly and second wheel assembly have an up position and a down position.

5. The implement of claim 4 wherein the first end wheel assembly and the second end wheel assembly are in the up position when the implement is in the field position and in the down position when the implement is in the transport position.

6. The implement of claim 1 further comprising: a first wheel actuator to raise and lower the first end wheel assembly; and, a second wheel actuator to raise and lower the second end wheel assembly.

7. The implement of claim 1 wherein the channel of the first end wheel assembly has an open end and a terminating end.

8. The implement of claim 7 wherein the channel of the first end wheel assembly is oriented generally upwards as the channel runs from the terminating end to the open end.

9. The implement of claim 8 further comprising an angled entry at the open end of the channel of the first end wheel assembly.

10. The implement of claim 1 wherein the first positioning member is attached to the second end of the first wing section by a first positioning bracket and the second positioning member is attached to the second end of the second wing section by a second positioning bracket.

11. The implement of claim 1 wherein the first end wheel assembly further comprises a biasing device to bias the wheel pivot to rotate relative to the wheel member.

12. The implement of claim 1 further comprising: a first wheel actuator connected between the first wing section and the first end wheel assembly to raise and lower the first end wheel assembly; and a second wheel actuator connected between the second wing section and the second end wheel assembly to raise and lower the second end wheel assembly.

13. The implement of claim 1 wherein the wheel pivot on the first end wheel assembly comprises: a vertical member; and a horizontal member, the horizontal member pivotally connected to the wheel member and to the top of the vertical member, the vertical member rotatably connected to the end wheel.

14. The implement of claim 1 further comprising ground wheels attached to the center section, the ground wheels vertically moveable relative to the center section.

15. The implement of claim 6 wherein the end wheel of the first end wheel assembly has pivoted back inwards to a direction parallel to a centerline of the first wing section when the first positioning member has travelled to a terminating end of the channel.

16. The implement of claim 1 wherein the first end wheel assembly further comprises a spherical bearing connected the second end of the guide plate to the wheel pivot.

17. An end wheel assembly, for transforming an implement frame from a transport position to a field position, the end wheel assembly comprising:
an end wheel;
a wheel pivot rotatably connected to the end wheel so that the end wheel rotates around a first axis running through a center of the end wheel;
a wheel member pivotally connected to the wheel pivot so that the wheel pivot and the end wheel pivot, relative to the wheel member, around a second axis;

at least one attachment bracket attached to the wheel member and pivotally attachable to the implement frame;

a wheel actuator to raise and lower the end wheel assembly; and a guide plate having a channel, a first end connected to the wheel member, and a second end connected to the wheel pivot, the channel positioned to receive a positioning member attached to the implement frame when the end wheel assembly is pivoted downwards around a third axis and, as the first wheel assembly is pivoted further downwards around the third axis, the first positioning member travels through the channel, rotating the guide plate and causing the wheel pivot and the end wheel to pivot relative to the wheel member around the second axis, turning the end wheel outwards.

18. The end wheel assembly of claim 17 wherein the end wheel assembly has an up position for when the implement frame is in the field position and a down position for when the implement frame is in the transport position.

19. The end wheel assembly of claim 17 wherein the channel has an open end and a terminating end.

20. The end wheel assembly of claim 19 wherein the channel is oriented generally upwards as the channel runs from the terminating end to the open end.

21. The end wheel assembly of claim 20 further comprising an angled entry at the open end of the channel.

22. The end wheel assembly of claim 17 further comprising a spherical bearing connected the second end of the guide plate to the wheel pivot.

23. The end wheel assembly of claim 17 wherein the first end wheel assembly further comprises a biasing device to bias the wheel pivot to rotate the end wheel inwards, relative to the wheel member.

24. The end wheel assembly of claim 19 wherein the end wheel of the first end wheel assembly has pivoted back inwards to a direction parallel to a centerline of the implement when the first positioning member has travelled to the terminating end of the channel.

* * * * *

UNITED STATES PATENT AND TRADEMARK OFFICE
CERTIFICATE OF CORRECTION

| | |
|---|---|
| PATENT NO. | : 12,048,260 B2 |
| APPLICATION NO. | : 17/456423 |
| DATED | : July 30, 2024 |
| INVENTOR(S) | : Tyler Sakundiak and Lyndon Maurer |

It is certified that error appears in the above-identified patent and that said Letters Patent is hereby corrected as shown below:

On the Title Page

Column 1, (71) Applicant after "Degelman", change by deleting "Industries, LP" and inserting -- Industries LP --.

Signed and Sealed this
Third Day of September, 2024

Katherine Kelly Vidal
*Director of the United States Patent and Trademark Office*